(12) United States Patent
Williams

(10) Patent No.: US 6,826,468 B2
(45) Date of Patent: Nov. 30, 2004

(54) METHOD AND SYSTEM FOR CLASSIFYING VEHICLE CONDITIONS

(75) Inventor: Kyle W. Williams, Shelby Township, MI (US)

(73) Assignee: Robert Bosch Corporation, Broadview, IL (US)

(*) Notice: Subject to any disclaimer, the term of this patent is extended or adjusted under 35 U.S.C. 154(b) by 0 days.

(21) Appl. No.: 10/248,924

(22) Filed: Mar. 3, 2003

(65) Prior Publication Data

US 2004/0176897 A1 Sep. 9, 2004

(51) Int. Cl.$^7$ .......................... B60R 21/32; G06F 15/02
(52) U.S. Cl. .......................... 701/70; 701/38; 340/440; 280/5.502
(58) Field of Search .................... 701/70, 1, 36, 701/38, 29, 37; 340/440; 280/5.502, 5.507, 735; 180/282; 702/150, 151

(56) References Cited

U.S. PATENT DOCUMENTS

| | | | |
|---|---|---|---|
| 5,040,118 A | 8/1991 | Diller | 701/45 |
| 5,583,771 A | 12/1996 | Lynch et al. | 701/36 |
| 6,002,975 A | 12/1999 | Schiffmann et al. | 701/36 |
| 6,138,066 A | 10/2000 | Guo et al. | 701/38 |
| 6,185,489 B1 | 2/2001 | Strickler | 701/29 |
| 6,338,012 B2 | 1/2002 | Brown et al. | 701/1 |
| 6,424,897 B1 | 7/2002 | Mattes et al. | |
| 6,433,681 B1 | 8/2002 | Foo et al. | 340/440 |
| 6,438,464 B1 | 8/2002 | Woywod et al. | 701/1 |
| 6,560,519 B2 | 5/2003 | Williams et al. | |
| 6,654,671 B2 * | 11/2003 | Schubert | 701/1 |
| 2001/0029438 A1 | 10/2001 | Tobaru et al. | 702/151 |
| 2001/0038202 A1 | 11/2001 | Tobaru et al. | 780/805 |
| 2002/0087235 A1 | 7/2002 | Aga et al. | 701/1 |
| 2002/0169577 A1 | 11/2002 | Mattes et al. | 702/150 |
| 2003/0055549 A1 * | 3/2003 | Barta et al. | 701/70 |
| 2003/0093201 A1 * | 5/2003 | Schubert et al. | 701/46 |

FOREIGN PATENT DOCUMENTS

| | | |
|---|---|---|
| DE | 102 35 567 | 2/2004 |
| EP | 1 270 337 | 1/2003 |

OTHER PUBLICATIONS

Robert Bosch Corporation, Rollover Sensing Blockdiagram for Rollover Sensing Algorithm, Chrysler Presentation, Aug. 1999.
Robert Bosch Corporation, Rollover Sensing Blockdiagram for Rollover Sensing Algorithm, Chrysler Presentation, Oct. 27, 2000.
Robert Bosch Corporation, Rollover Sensing Soil Trip Development Status in Oct. 2000, Chrysler Presentation, Feb. 13, 2001.
Robert Bosch GmbH, Ford Presentation, Mar. 20, 2002.
Robert Bocsh GmbH, Land Rover Presentation, Nov. 18, 2002.
Declaration of Kyle W. Williams, Aug. 8, 2003.

* cited by examiner

Primary Examiner—Tan Q. Nguyen
(74) Attorney, Agent, or Firm—Michael Best & Friedrich LLP

(57) ABSTRACT

A method and system for classifying vehicle conditions. Lateral acceleration information, vertical acceleration information, and roll angle information is acquired and the roll angle information is used for compensating the acceleration information for the effects of gravity. The compensated acceleration information is compared with one or more thresholds to change calibrateable counter values and additional threshold comparisons are used to determine the vehicle condition or rollover type.

18 Claims, 4 Drawing Sheets

METHOD AND SYSTEM FOR CLASSIFYING VEHICLE CONDITIONS

BACKGROUND OF INVENTION

The invention generally relates to methods and systems for classifying rollover events or conditions associated with vehicles. More specifically, the invention relates to using acceleration information and vehicle orientation information to determine a type of vehicle rollover event.

It is known that vehicles, such as automobiles, are capable of rolling over under certain driving and environmental conditions. In the event that a vehicle does or is about to rollover, vehicle occupants are at risk of serious injury. To reduce the risk of injury, a vehicle may include a rollover sensing system that senses when a vehicle rollover event occurs or senses the occurrence of conditions that are indicative of a rollover event occurring. Upon sensing the relevant event or conditions, the system activates safety devices such as seat belt retractors or airbags. Regardless of their exact architecture or design, rollover detection systems are often explained in terms of detecting the occurrence of a rollover event before the vehicle has fully rolled over. This convention is followed in the discussion below.

One known rollover system includes a controller that receives information from a plurality of sensors including a roll rate, a yaw rate, a vehicle speed, and a lateral acceleration sensor. The vehicle roll angle is determined by integrating information from the roll rate sensor and a cant compensation is determined from the lateral acceleration, vehicle speed, and yaw rate data. The controller uses sensor information as axis parameters for a two-dimensional map, or mode map, and determines which region of the map contains the present state of the vehicle.

Other known systems also implement mode maps for detecting lateral overturning. For example, some employ multiple sensors and two-dimensional maps that utilize the roll angle and rolling angular speed as axis parameters. A determination of an overturn possibility may be based on the location of a hysteresis path traced by the roll angle and rolling angular inputs. Some of these systems include a threshold value line that designates regions of lateral overturn and lateral non-overturn and may be shifted in response to a rolling resonance. In addition, some systems include an occupant position sensor and utilize an output signal to control an occupant protection system.

SUMMARY OF INVENTION

Although systems for detecting a vehicle rollover event exist, they are not completely satisfactory. Prior systems and methods are excessively complex and do not possess, or are limited in, the ability to timely determine rollover events while, or in addition to, compensating for the effects of gravity. Accordingly, a need exists for a system and method to classify a type of vehicle rollover event that includes calibrateable and less complex algorithms, which compensate for gravitational effects and provide quicker and more reliable rollover event determination.

In one embodiment, the invention includes a method for detecting a rollover condition of a vehicle where lateral acceleration information, vertical acceleration information, and roll angle information is acquired and processed. In one embodiment, the roll angle information is used in compensating the acceleration information for the effects of gravity. The compensated acceleration information is compared with one or more thresholds. The comparison is used to change a counter and additional threshold comparisons are used to determine the vehicle condition or rollover type. In some embodiments, the thresholds and counter variables are calibrateable.

In another embodiment, a vehicle has a frame and one or more sensors that are operable to sense an acceleration of the vehicle. A processor is coupled to the vehicle and receives information from the one or more sensors. The processor includes one or more modules, such as a gravity compensation module, an acceleration counter module, and a classification module. In addition, the processor is operable to compensate the information received from the one or more sensors based on an angle of the vehicle, change a value associated with a counter in response to the compensated information, and determine a type of vehicle condition based on the value associated with the counter.

Additional objects and features of the invention are illustrated in the drawings and provided in the subsequent disclosure.

DETAILED DESCRIPTION

Figure 1:
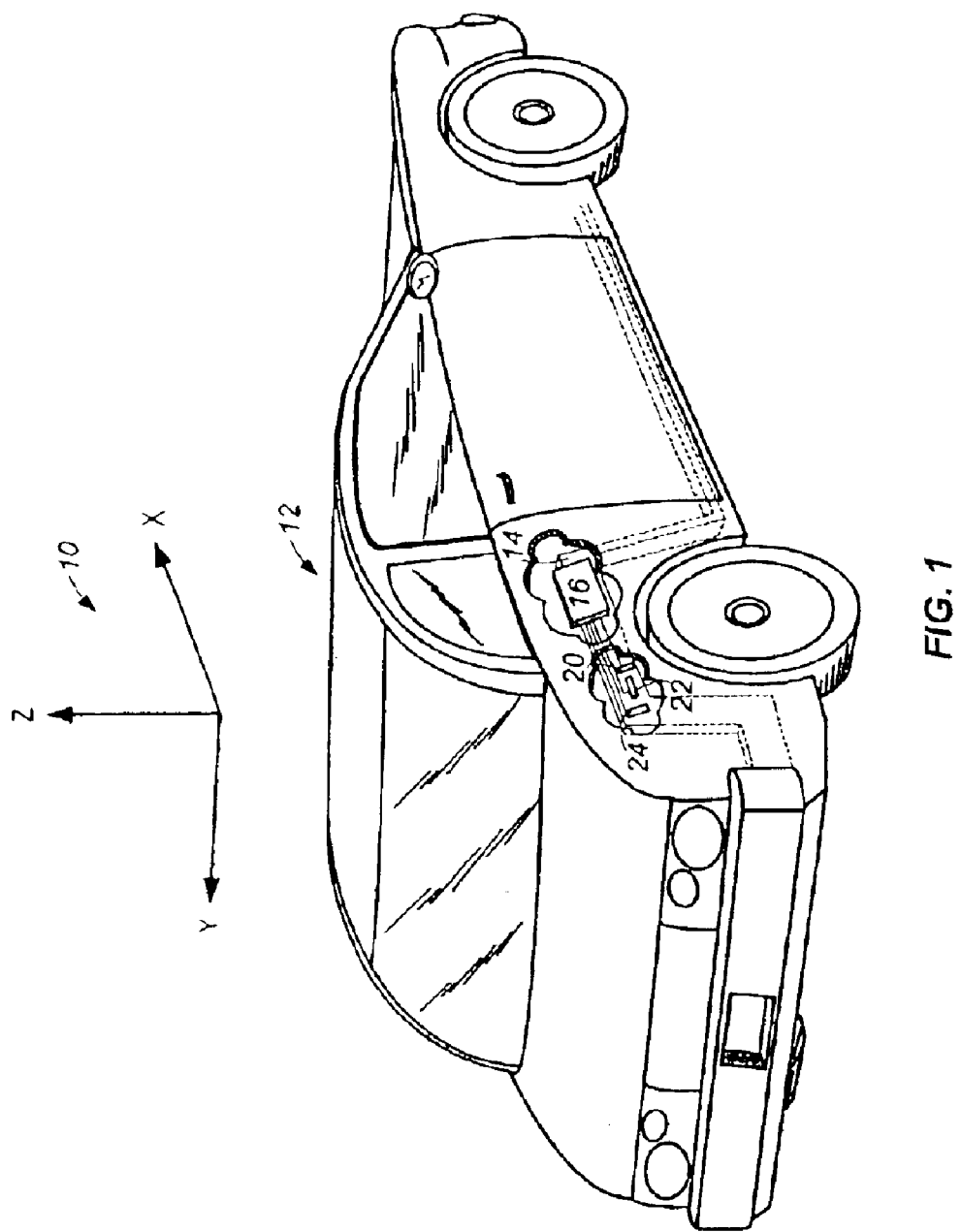
FIG. 1 illustrates an exemplary vehicle, coordinate frame, and components of one embodiment of the invention located in the vehicle.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of including, comprising, or having and variations thereof herein is meant to encompass the items listed thereafter and equivalents thereof as well as additional items. The terms mounted, connected, and coupled are used broadly and encompass both direct and indirect mounting, connecting, and coupling. Further, connected and coupled are not restricted to physical or mechanical connections or couplings.

It should be noted that the invention is not limited to any particular software language described or implied in the figures. One of skill in the art will understand that a variety of alternative software languages may be used for implementation of the invention. It should also be understood that some components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Referring to the drawings, FIG. 1 illustrates an exemplary vehicle 12 having a coordinate frame 10. It should be noted that the term vehicle, as used herein, is defined as including any vehicle, including overland vehicles such as, cars, trucks, vans, buses, tractors, motorcycles, or similar devices. Embodiments of the invention are discussed with reference to a coordinate frame having an x-axis generally parallel with the longitudinal axis of the vehicle 12. The x-axis has a positive direction corresponding to forward vehicle motion. An y-axis is oriented generally perpendicular to the longitudinal axis, and thus the x-axis, and has a positive direction corresponding to leftward vehicle movements. A z-axis is oriented perpendicular to both the x-axis and y-axis and has a positive direction corresponding to upward movements of the vehicle 12.

The vehicle 12 includes a frame 14 and a processor 16 (shown schematically) which may by mounted on or located in any convenient location within the vehicle 12. Although not preferred, the processor 16 could even be located at a remote location. One or more sensors are also coupled to the processor 16, and preferably mounted or coupled to the vehicle. The sensors may include acceleration-type sensors, such as a lateral accelerometer 20 and a vertical accelerometer 22, and vehicle angle or angular-rate sensors, such as sensor 24. The term processor is used herein to encompass one or more hardware or software components implemented for receiving, modifying, storing, and/or outputting data or information. One of ordinary skill in the art will understand that a plurality of components may be utilized to realize the above-noted functions including application specific integrated circuits ("ASIC"), micro-controllers/processors or other semiconductor-based components, other solid state components, or future developed processing technology. The angular-rate sensor 24 is a device that senses an angular rate or angular velocity of the vehicle about the x-axis, and generates an angular-rate signal correlated with the angular rate of the vehicle. The angular-rate signal is provided to the processor 16. An exemplary angular-rate sensor 155 of the invention is a CMG044-MM2 angular sensor chip manufactured by Robert Bosch GmbH.

The lateral acceleration sensor 20 senses the inertial reaction of the vehicle 12 along the y-axis and provides lateral acceleration information representative of the lateral acceleration of the vehicle 12. Similarly, the vertical acceleration sensor 22 senses the inertial reaction of the vehicle 12 along the z-axis, and generates vertical acceleration information representative of the vertical acceleration of the vehicle 12. Although the lateral and vertical acceleration sensors 22 and 24 are shown separately, they may be combined into a single sensor or chip. For example, an exemplary accelerometer chip that provides lateral and vertical acceleration is an SMB100 accelerometer chip manufactured by Robert Bosch GmbH.

Figure 2:
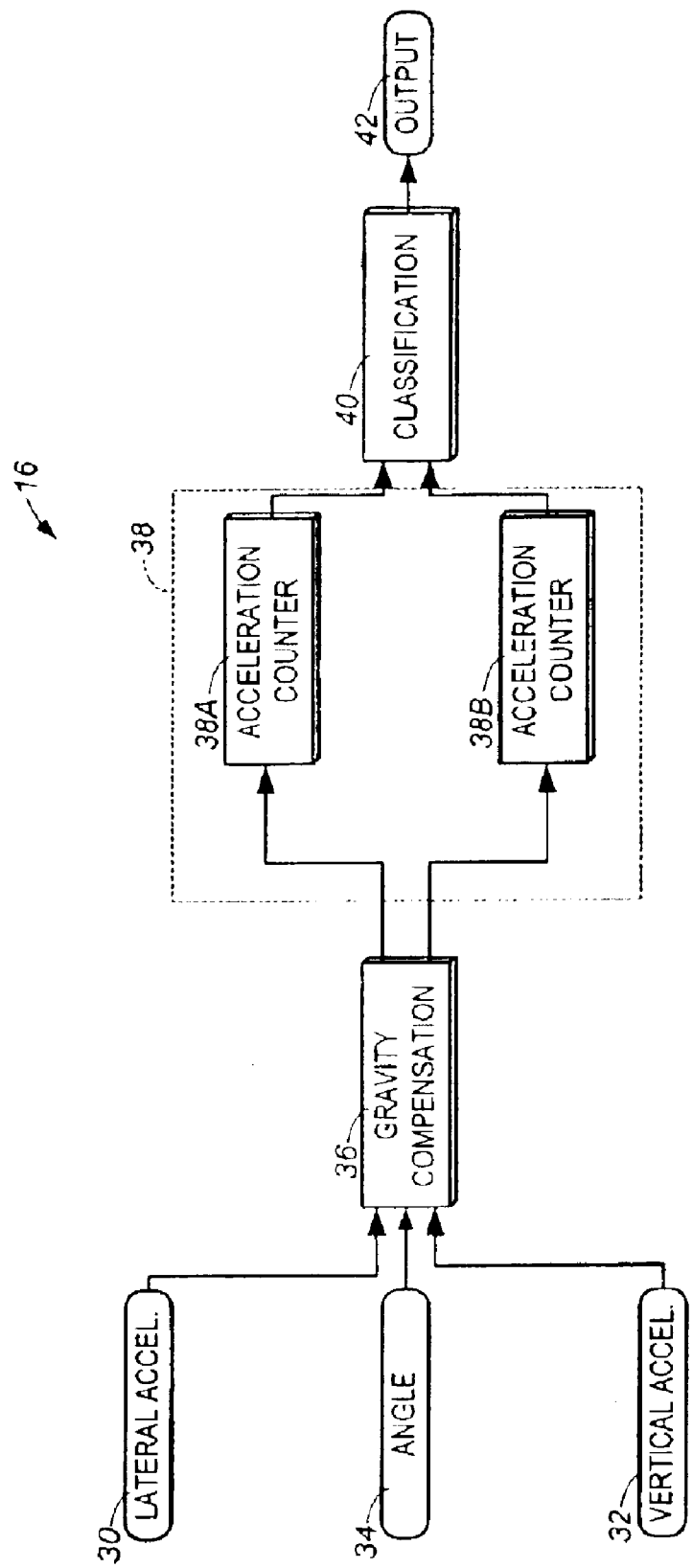
FIG. 2 illustrates an exemplary classification algorithm according to one embodiment of the invention.

The processor 16 is operable to acquire the vehicle angle, lateral acceleration, and vertical acceleration information from the sensors 20, 22, and 24, and includes one or more modules (hardware or software) for executing operations or instructions or otherwise processing information acquired from the sensors 14. FIG. 2 schematically illustrates one embodiment of the processor 16. In the embodiment shown, the processor 16 receives information in the form or a lateral acceleration input 30, a vertical acceleration input 32, and an angle input 34. The inputs 30, 32, and 34 are delivered to a gravity compensation module 36. The gravity compensation module 36 outputs or otherwise communicates information to a counter module 38, which in the embodiment shown includes lateral and vertical acceleration counter modules 38A and 38B. As will be discussed in greater detail below, in the embodiment shown, the acceleration counter modules 38A and 38B are similar to one another. Information from the counter modules 38A and 38B is output or otherwise delivered to a classification module 40. In the embodiment shown, the classification module 40 generates an output 42. The output 42 is generally indicative of a rollover event classification based on the conditions of the vehicle 12.

Figure 3:
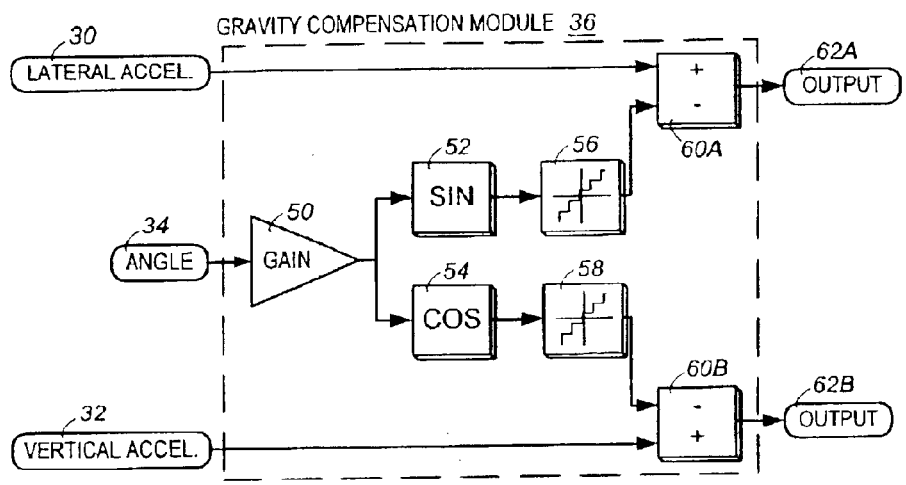
FIG. 3 illustrates a gravity compensation module according to one embodiment of the invention.
Figure 4:
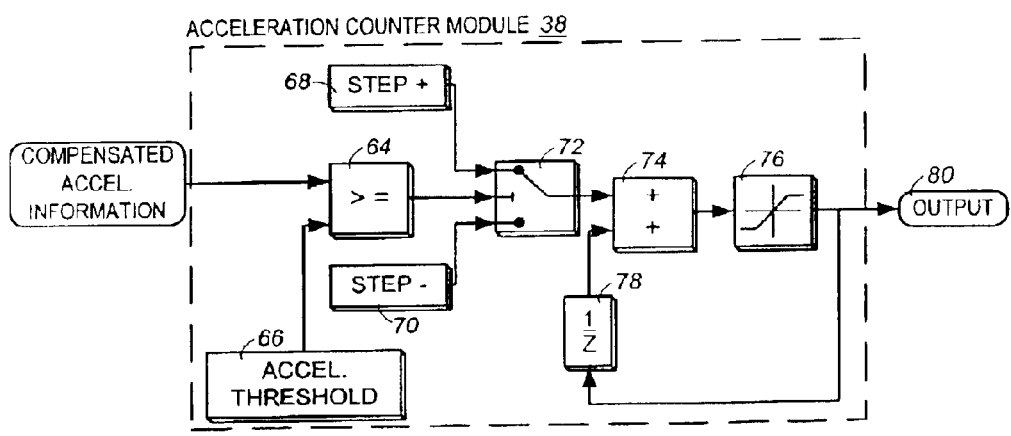
FIG. 4 illustrates an acceleration counter module according to one embodiment of the invention.
Figure 5:
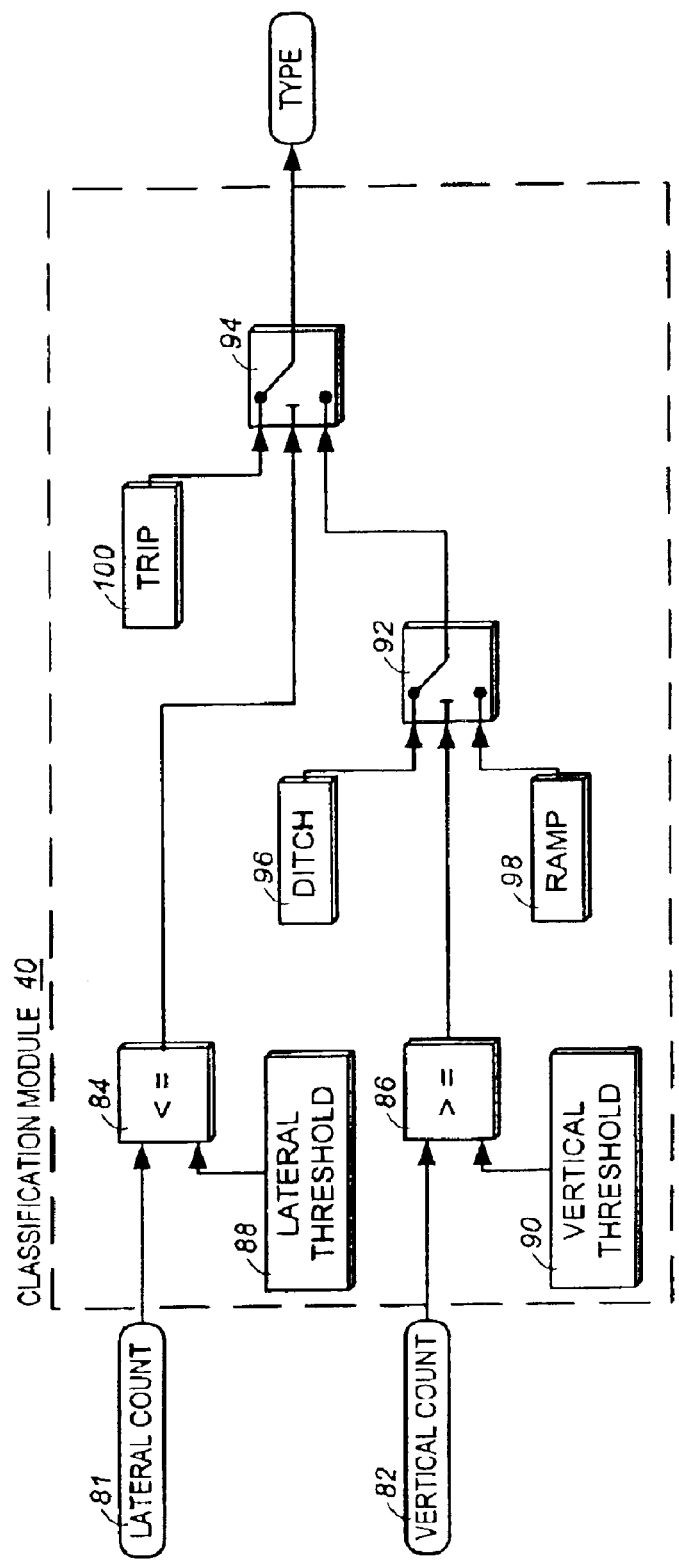
FIG. 5 illustrates a classification module according to one embodiment of the invention.

Further details of the modules 36, 38, and 40, as implemented in one exemplary embodiment, are provided in FIGS. 3–5. In general, the modules depicted in these figures are illustrated using functional or logical block representations. As noted, these representations may be implemented in hardware, software, or a combination of both.

FIG. 3 illustrates one embodiment of the gravity compensation module 36 where vehicle angle information is used to compensate or adjust the lateral and vertical acceleration information for the acceleration due to gravity. More specifically, the angle information is fed through an amplifier 50, which may be used to adjust amplitude and/or perform a degree to radian conversion. The angle information is then processed. In the embodiment shown, the processing involves resolving the angle information into its constituent parts. For example, a sine block 52 and a cosine block 54 illustrate respective filtering, or resolution, of the angle information into horizontal and vertical components. These components are quantized, or quantified discretely, as represented by quantization blocks 56 and 58. The quantization blocks pass the input signal through a stair-step function so that multiple input values are mapped to one output value as determined by a step value. The effect is to quantize a smooth signal into a stair-step output that changes discretely by integer numbers of the step value. The output may be computed using a round-to-nearest method that produces an output that is symmetric about a zero reference. After quantization, the lateral and vertical components of the acceleration due to gravity are subtracted (blocks 60A and 60B) from the lateral and vertical acceleration information received from the accelerometers 20 and 22. The results of the subtraction or differences are output from or passed out of the compensation module 36, as represented by the output blocks 62A and 62B, to the counter modules 38 for further processing.

FIG. 4 illustrates an exemplary embodiment of a counter module that may be used to implement the counter modules 38A and 38B. Each counter module 38A, 38B receives the compensated acceleration information and outputs an acceleration count. As noted, similar logic may be implemented for both the lateral and vertical acceleration counter modules 38A and 38B, with the option that the threshold values and saturation limits (described below) are calibrateable and, therefore, may be different. As shown in FIG. 4, a comparison block 64 performs a comparison of the compensated acceleration information input to the module 38 to an acceleration threshold 66. The output of the comparison block 64 may be a Boolean type indicator that is used to select between a step up operation 68 (Step +) and a step down operation 70 (Step ). For example, if the input acceleration information is less than the acceleration threshold 66, the step down operation 70 is selected. If the input acceleration information is greater than the acceleration threshold 66, the step up operation 68 is selected. In one embodiment, the step up operation 68 and the step down operation 70 are implemented as respective increment and decrement values that are calibrateable and may differ in magnitude. The output of the select block 72 is input to a summing block 74. A saturation block 76 imposes upper and lower bounds on the output of the summing block 74. When the output from the summing block 74 is within the range specified by upper and lower limit parameters, the value passes through unchanged. When outside these limits, the value is clipped (i.e., the amplitude of the value is limited) to the upper or lower bound. The output 80 of the saturation block 76 is sent to the classification module 40 (FIG. 5) and also to delay block 78. The delay block 78 holds the previous output value for a predetermined amount of time, which is one embodiment is one cycle or period. The delay block then outputs the value to the summing block 74. The summing block 74, saturation block 76, and delay block 78 form a closed loop accumulation system, or counter, for incrementing or decrementing a count value, which is output from the select block 72, between upper and lower limits. This count value is determined in response to the comparison of the acceleration threshold and the compensated acceleration information input into the counter module 38. The acceleration threshold 66 is calibrateable and may be set to different values depending on implementation of the counter module 38 as either the lateral acceleration counter module 38A or the vertical acceleration counter module 38B. The above implementation allows for reliable acceleration classifications because the acceleration of the vehicle is affected by the angle of the vehicle. Compensating for the effects of gravity, as described above, ensures that reliable information is used when making the classification decision. In addition, the use of calibrateable increment and decrement values allows, for example, a larger value to be output for step up operation 68 than the step down operation 70, thereby providing quick reaction to acceleration events.

FIG. 5 illustrates one embodiment of the classification module 40. As noted, the acceleration module receives count information from the modules 38A and 38B. In the embodiment shown these outputs are illustrated as a lateral count 81 and a vertical count 82. More specifically, the counts 81 and 82 are based on the output of the lateral acceleration counter module 38A and the vertical acceleration counter module 38B, respectively. The counts 81 and 82 are passed to comparison blocks 84 and 86, respectively. The comparison blocks 84 and 86 compare the counts 81 and 82 to a lateral count threshold 88 and a vertical count threshold 90, respectively. As described above, output of the comparison blocks 84 and 86 may be a Boolean type indicator that is used as a selector input, or control input, to select blocks 92 and 94. The output of select block 92 may be a value representing a rollover type classification that is based on vertical acceleration count information. In the illustrated embodiment, if the vertical count 82 is greater than or less than the vertical count threshold 90, the output of the select block 92 is a value, such as a ditch mode value 96 or a ramp mode value 98. The output of the select block 92 is provided as one input to the select block 94. If the lateral count 80 is greater than or less than the lateral count threshold 88, the output of the select block 94 is a trip mode value 100 or the value previously output from the select block 92 (i.e., ditch mode value 96 or ramp mode value 98). This output value may then be used or stored by the processor 16 or may be output to another processor/controller. The output may be a binary value or some other value, such as a voltage magnitude, corresponding to the event classification. For example, the output of the classification module 40 may be a value, such as 1, 2, or 3, which represents the event classification (e.g., ramp, ditch, or trip). In addition, the output value may be used to select switches or used in other control algorithms, such as those designed to control deployment or activation of occupant safety systems.

As noted above, the output of the classification module 40 is a vehicle rollover event mode or classification, such as a trip, ditch, or ramp classification. The ramp classification may occur for an upward rollover event where the vehicle 12 is traveling in a forward direction and then travels across an object or an inclined surface resulting in an upward roll. The ditch classification may occur for a downward rollover event where the vehicle 12 is traveling in a forward direction and then travels across an object or a declined surface resulting in a downward roll. The trip classification may occur when the vehicle 12 is initially traveling in a forward direction, rotates about the z-axis of the vehicle such that the vehicle is "sliding" sideways, and travels or "trips" across an "object resulting in a vehicle roll. The object may be a curb, a depression, a location where there is a change in the coefficient of friction of the surface upon which the vehicle is travelling, or a variety of other things or conditions.

As can be seen from the above, one embodiment of the invention provides a method and system classifying vehicle rollover events. Various features and aspects of the invention as set forth in the following claims.

What is claimed is:

1. A method for detecting a rollover condition of a vehicle having x, y, and z-axes, a laterally oriented reference frame corresponding to the y-axis, and a vertically oriented reference frame corresponding to the z-axis, the method comprising:

acquiring first lateral acceleration information representative of an acceleration of the vehicle in the direction of the y-axis;

acquiring first vertical acceleration information representative of an acceleration of the vehicle in the direction of the z-axis;

acquiring roll angle information based on an angle of the vehicle about the x-axis and relative to the y-axis;

processing the roll angle information to provide second lateral acceleration information and second vertical acceleration information;

determining compensated lateral acceleration information based on a combination of the first and second lateral acceleration information;

determining compensated vertical acceleration information based on a combination of the first and second vertical acceleration information;

changing a counter value based on a comparison of compensated acceleration information and a first threshold value; and comparing the counter value with a second threshold value to determine a type of vehicle condition.

2. The method of claim 1, wherein the second lateral acceleration and second vertical acceleration information is used to compensate for the effects of gravity.

3. The method of claim 1, wherein changing the counter value includes incrementing or decrementing the counter value by a calibrateable value.

4. The method of claim 1, wherein comparing the counter value with a second threshold value includes comparing the counter value to an acceleration count value.

5. The method of claim 1, wherein the type of vehicle condition includes one of either a ramp, a ditch, or a trip classification.

6. The method of claim 1, wherein the first and second threshold values are calibrateable.

7. The method of claim 1, wherein processing the roll angle information includes resolving the roll angle information into components.

8. A system for classifying a rollover condition of a vehicle having x, y, and z-axes, the system comprising:

one or more sensors operable to sense an acceleration of the vehicle; and a processor operable to receive information from the one or more sensors;

compensate the information received from the one or more sensors based on an angle of the vehicle;

compare a value based on the compensated information to a threshold value;

change a value associated with a counter; and determine a type of vehicle condition based on the value associated with the counter.

9. The system of claim 8, wherein the one or more sensors are coupled to a frame of the vehicle.

10. The system of claim 8, wherein the type of vehicle condition includes one of either a ramp, a ditch, or a trip classification.

11. The system of claim 8, wherein the threshold value is calibrateable.

12. A vehicle having x, y, and z reference axes and a laterally and vertically oriented reference frame corresponding to the y and z-axis respectively, the vehicle comprising:

a frame;

one or more sensors coupled to the frame and operable to sense an acceleration of the vehicle; and a processor coupled to the vehicle and operable to receive information from the one or more sensors, and including a gravity compensation module;

an acceleration counter module; and a classification module;

wherein the processor is operable to compensate the information received from the one or more sensors based on an angle of the vehicle, change a value associated with a counter in response to the compensated information, and determine a type of vehicle condition based on the value associated with the counter.

13. The vehicle of claim 12, wherein the type of vehicle condition includes one of either a ramp, a ditch, or a trip classification.

14. The vehicle of claim 12, wherein the gravity compensation module is operable to resolve the vehicle angle into lateral and vertical components.

15. The vehicle of claim 12, wherein the acceleration counter module is operable to change the value associated with the counter in response to the compensated information.

16. The vehicle of claim 15, wherein changing the value associated with the counter includes incrementing and decrementing the value by a calibrateable value.

17. The vehicle of claim 12, wherein the classification module is operable to receive the value associated with the counter and to determine the type of vehicle condition based on the comparison of the value associated with the counter and a threshold value.

18. The vehicle of claim 17, wherein the threshold value is calibrateable.

* * * * *